United States Patent [19]

Hagen

[11] 4,156,852
[45] May 29, 1979

[54] MULTIPASS LASER AMPLIFICATION WITH NEAR-FIELD FAR-FIELD OPTICAL SEPARATION

[75] Inventor: Wilhelm F. Hagen, Livermore, Calif.

[73] Assignee: The United States of America as represented by the United States Department of Energy, Washington, D.C.

[21] Appl. No.: 868,640

[22] Filed: Jan. 11, 1978

[51] Int. Cl.² .............................................. H01S 3/08
[52] U.S. Cl. .................................. 330/4.3; 331/94.5 C
[58] Field of Search .................... 330/4.3; 331/94.5 C; 356/106 LR

[56] References Cited

U.S. PATENT DOCUMENTS

| | | | |
|---|---|---|---|
| 3,247,467 | 4/1966 | Geusic et al. | 330/4.3 |
| 3,258,717 | 6/1966 | Katzman | 330/4.3 |
| 3,585,523 | 6/1971 | Glenn et al. | 331/94.5 C |
| 3,942,127 | 3/1976 | Fluhr et al. | 330/4.3 |
| 4,001,705 | 1/1977 | Sinclair et al. | 331/94.5 C |
| 4,093,924 | 6/1978 | Farcy | 330/4.3 |

OTHER PUBLICATIONS

Hunt et al., "The Use of Multiple Spatial Felters as a Relay Line in Laser Fusion Systems", 9/9/76, pp. 1–7, Preprint 78653, Lawrence Livermore Laboratory.

*Primary Examiner*—Nelson Moskowitz
*Attorney, Agent, or Firm*—Roger S. Gaither; P. Martin Simpson; John F. Schipper

[57] ABSTRACT

This invention discloses two classes of optical configurations for high power laser amplification, one allowing near-field and the other allowing far-field optical separation, for the multiple passage of laser pulses through one or more amplifiers over an open optical path. These configurations may reimage the amplifier or any other part of the cavity on itself so as to suppress laser beam intensity ripples that arise from diffraction and/or non-linear effects. The optical cavities combine the features of multiple passes, spatial filtering and optical reimaging and allow sufficient time for laser gain recovery.

36 Claims, 5 Drawing Figures

MULTIPASS LASER AMPLIFICATION WITH NEAR-FIELD FAR-FIELD OPTICAL SEPARATION

BACKGROUND OF THE INVENTION

The invention described herein arose at the Lawrence Livermore Laboratory, University of California, in the course of or under contract W-7405-ENG-48 with the U.S. Department of Energy.

The use of multipass amplifiers is potentially attractive in laser generation of high density and high temperature plasmas as it reduces the number of amplifiers required in an amplifier chain and thus reduces the cost and complexity of the associated laser system while increasing the overall system efficiency. Up to 35% of the stored energy can be extracted efficiently from a conventional single pass laser amplifier in a short pulse, due to the flux limitations caused by damage of optical components and due to depletion of the population inversion in the two energy levels used for amplification. Multiple passes through an amplifier can double the extracted energy, provided that sufficient time between passes is allowed for laser gain recovery through decay of the lower laser level or by other processes.

A number of requirements are essential in any high power laser amplifier chain design. Spatial filtering between amplifier passes is necessary to reduce the growth of small scale intensity ripples on the beam, arising from non-linear effects. Reimaging of the beam on itself or beam optical relaying from one amplifier to the next is desirable to avoid large scale beam intensity ripples due to diffraction and/or non-linear effects. For the multipass configurations considered here, it is important to keep the cavity losses as low as possible. Use of optical components that do not contribute to non-linear beam distortion is preferable so that, ceteris paribus, use of mirrors is preferable to the use of lenses. In multipass configurations with spatial filters it is essential to allow time for dispersal of any plasma blowoff generated at a spatial filter aperture. Estimates of the dispersal time for such a plasma correspond to a path length of several kilometers, which would significantly increase the cost of a multipass system with a single pinhole. The use of several, sequentially used spatial filters allows selection of different aperture sizes and associated cutoff frequencies of the intensity ripples in the laser beam.

Multipass and/or regenerative amplifiers have been known for many years but have never been applied in the present context. U.S. Pat. No. 3,597,695 to Swain et al teaches and shows use of one or more passes of a laser pulse through a single amplifier placed inside an optical cavity for laser amplification. The (polarized) laser pulses are injected into the cavity, which contains the amplifier and two mirrors spaced therefrom, and are allowed to pass one or more times through the amplifier before being switched out of the cavity by polarity control using a Pockels cell. The amplifier is excited only once, and the energy output of the amplifier is limited by damage to the weakest component, which is the Pockels cell. Swain et al, appears to contemplate only the use of a relatively long lifetime gain medium, such as Nd:glass, where multiple excitation of the gain medium is unnecessary. Multiple excitation of the amplifier medium and switching techniques implying other means than a Pockel cell are not described.

U.S. Pat. No. 3,646,469 to Buczek et al teaches and claims the use of a ring interferometer, acting as a regenerative amplifier and being driven by a low power oscillator, with the amplifier gain just below the threshold for oscillation. The gain medium of this traveling wave regenerative amplifier is driven in only one direction around the ring and requires slaving the resonant frequency of the ring interferometer to the oscillator, which should have spectrally pure output.

U.S. Pat. No. 3,414,835 to Miller, teaches and claims the use of a closed path optical system to cause an injected laser pulse to be multiply reflected from two or more surfaces and to be periodically focused and refocused so that the light beam passes through a transparent work piece or sample many times. No provision is made for rapidly and repetitively amplifying the laser pulse each time it traverses the optical system or for positioning the target in the cavity.

U.S. Pat. No. 3,668,536 to Michon teaches the use of a single amplifier with fully reflective means spaced from the ends of the amplifier, to reflect light back into the amplifier and cause the amplifier to respond as if it were several amplifier stages in series. Pulse switchout means is also provided. Michon is forced to shorten his pulse initally, to avoid overlap between counterpropagating portions of the same pulse; and Michon does not indicate how his amplifier stages might be repetitively pumped or how laser beam intensity ripples might be suppressed as the beam traverses the optical cavity.

Welch, in U.S. Pat. No. 3,968,456, teaches and claims the use of an optical cavity, containing two plane mirrors, two lenses and an amplifier, together with an external collimating lens for "directing" an external light beam into the cavity, in a regenerative laser device. The external lens is positioned adjacent and parallel to one of the cavity mirrors and is spaced a distance equal to external lens focal length from the adjacent mirror. The adjacent mirror is a highly transparent one, transmitting approximately 90% of the radiation incident thereon from within the cavity. The Welch invention serves as a highly sensitive amplifier or sensor of radiation incident upon the external lens, with the optical cavity amplifier being excited to just below threshold for laser operation, but the configuration is not particularly useful for a high power laser system. The cavity lenses 8, 12 of Welch cause the light beam to converge as the beam passes through the amplifier so that the fill factor and maximum gain are reduced. Further, the use of a highly transmissive mirror 14 defining one end of the cavity would be detrimental in the multipass configuration employed in the subject invention.

A "Long Path Laser" was built at Lawrence Livermore Laboratory to provide nine passes of a laser beam through a disk amplifier over an open optical path. As shown in Lawrence Livermore Laboratory Report UCRL-50021-71 Rev. 1 pp. 24–27. The beam was not focused between any of the 9 passes, and the energy output was only 200 Joules.

Past attempts to use regenerative amplifiers have been limited by the switch-out phase after laser beam amplification by diffraction effects, and by non-linear optics. As shown in the Long Path Laser, no switch is needed in an open optical path. As laser beam energy increases, the switch becomes a limiting element in the laser. In the Miller patent, the laser beam is focused on to a workpiece, but Miller does not address the diffraction and non-linear optics problems. In none of these patents is a spatial filter or an optical relay suggested. Design difficulties regarding beam quality of a laser beam exiting on open optical paths are not solved in the above art.

SUMMARY OF THE INVENTION

The invention is directed to methods and apparatus using multiple passes of a light beam through at least one regenerative amplifier with at least two focusing means for focusing the light beam to a common focal point while the light beam passes between at least two mirrors without passing through at least one amplifier. Due to this focusing, further embodiments may use spatial filtering, optical relaying, or both to suppress laser beam intensity ripples and to provide a high efficiency amplification system. Further embodiments attain a non-collimated beam exiting the optical path through the spacing of selected pairs of focusing means and throuh the use of an odd number of focusing means.

In a further embodiment, the claimed invention comprises one or more light beam amplifiers; two or more concave mirrors, each mirror having a focal length and being spaced a distance substantially equal to the focal length from the center of a light beam amplifier; and the mirrors being spaced from the amplifier so that light passing through the amplifier is reflected and focused by a first mirror and passes to a second mirror without first passing through the amplifier.

In a further embodiment, the claimed invention comprises one or more light beam amplifiers; two or more plane mirrors, tilted by a small angle relative to one another; two or more focusing means, each having an associated focal length and being spaced apart from one another by substantially the sum of the focal lengths and lying between the two plane mirrors. The focusing means form a sequence of light beam waists, used for introduction of the beam into the cavity defined by the plane mirrors, and for spatial filtering of the beam; one or more beam amplifiers is located adjacent to the plane mirrors within the cavity.

An object of the claimed invention is to produce a high energy laser beam.

Another object of the claimed invention is to produce a switchless laser amplifier.

Another object of the claimed invention is to produce a regenerative laser amplifier with a switch.

Another object of the claimed invention is to produce a high energy laser beam of high quality.

Other objects and advantages of this invention will become apparent from the following detailed description of preferred embodiments, as illustrated in the accompanying drawings.

DETAILED DESCRIPTION

The subject invention provides two different classes of multipass configurations that:

(1) allow multiple amplification of a laser pulse by repeated passage of the pulse through one or more amplifiers;
(2) minimize the use of optical components such as lenses;
(3) incorporate spatial filtering;
(4) provide sufficient time between consecutive passages of laser pulses through the amplifier to allow amplifier gain recovery; and
(5) optically reimage the amplifier or any other chosen optical component in the cavity upon itself.

Figure 1:
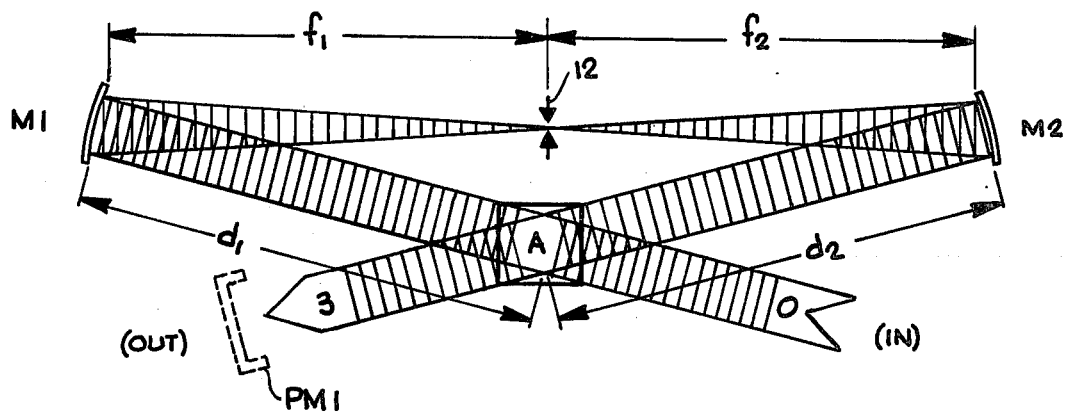
FIG. 1, is a schematic view of a double pass embodiment using near-field laser beam path separation.

FIG. 1 exhibits a two-pass option with near-field optical separation using two concave mirrors M1 and M2 and a laser amplifier A positioned as shown. The concave mirrors M1 and M2 have focal points which coincide with the position of a spacial filter F12 so that, for example, collimated light arriving in a parallel light beam at mirror M1 from the amplifier A is focused with its beam waist at the aperture of the spacial filter F12. This beam passes through the spacial filter to the concave mirror M2, which reflects and recollimates the light and sends the beam through the amplifier A again as shown, and the beam leaves the cavity. Incorporation of the spacial filter F12 at the beam waist is optional here, but the filter does provide desirable beam clean-up which minimizes or suppresses the small scale intensity ripples or variations across the beam which arise from non-linear distortions of the beam.

The use of a spatial filter for this purpose is discussed in a companion patent application Ser. No. 868,644 for a Laser System using Regenerative Amplifier by John L. Emmett, assigned to the assignee of this application and incorporated by reference herein.

A plane mirror PMI (shown in dotted lines in FIG. 1) may optionally be included in the "exit" path of the collimated light beam so as to reflect the beam back in the direction from whence it came. With the mirror PM1 incorporated in the cavity, then, the beam enters the cavity and passes through the amplifier A twice, is reflected at PM1, and retraces its path in the reverse direction so as to pass through the amplifier A four times and exit at the point where the beam first entered the cavity.

The amplifier-to-amplifier propagation length of the system shown in FIG. 1 (roughly four times the distance from mirror M1 to spatial filter F12) is limited at the lower end by three considerations. First, the beam round trip time in this circuit should be sufficiently long to allow amplifier gain recovery; a 30 meter round trip length would be required here if the gain recovery time is about 100 nsec. Second, if the optional plane mirror PM1 is incorporated in the cavity, the plasma blowoff generated by passage of the beam through the spatial filter aperture must be given time to disperse in about one circuit round trip time. Third, beam vignetting, associated with the passage of the beam through the amplifier at off-axis orientations imposes a lower limit on the length of the system and reduces the effective beam fill factor in the amplifier and thus the efficiency of amplification.

One method of increasing the effective fill factor would replace the parallel beam passing through the amplifier A by a slightly diverging beam that would just fill the clear aperture of the amplifier on the beams final pass through the amplifier. The effective fill factor for the beam would thus increase with each successive passage through the amplifier, up to and including the final pass. Since it is the effective fill factor and efficiency of amplification on the final passages through the amplifier which are most important, this approach has an obvious appeal where beam vignetting inposes severe constraints on system performance. This can be accomplished by separating the concave mirrors in FIG. 1 by a distance slightly less than the sum of the mirror focal lengths so that the light beam leaving the second mirror is slightly divergent, rather than being collimated, as it passes through the amplifier. A similar improvement will be obtained by sequential beam expansion, by selecting the concave mirrors M1 and M2 with differing focal lengths so as to allow sequential beam expansion or divergence. The concave mirrors themselves might be spherical, ellipsoidal or cylindrical.

Figure 2:
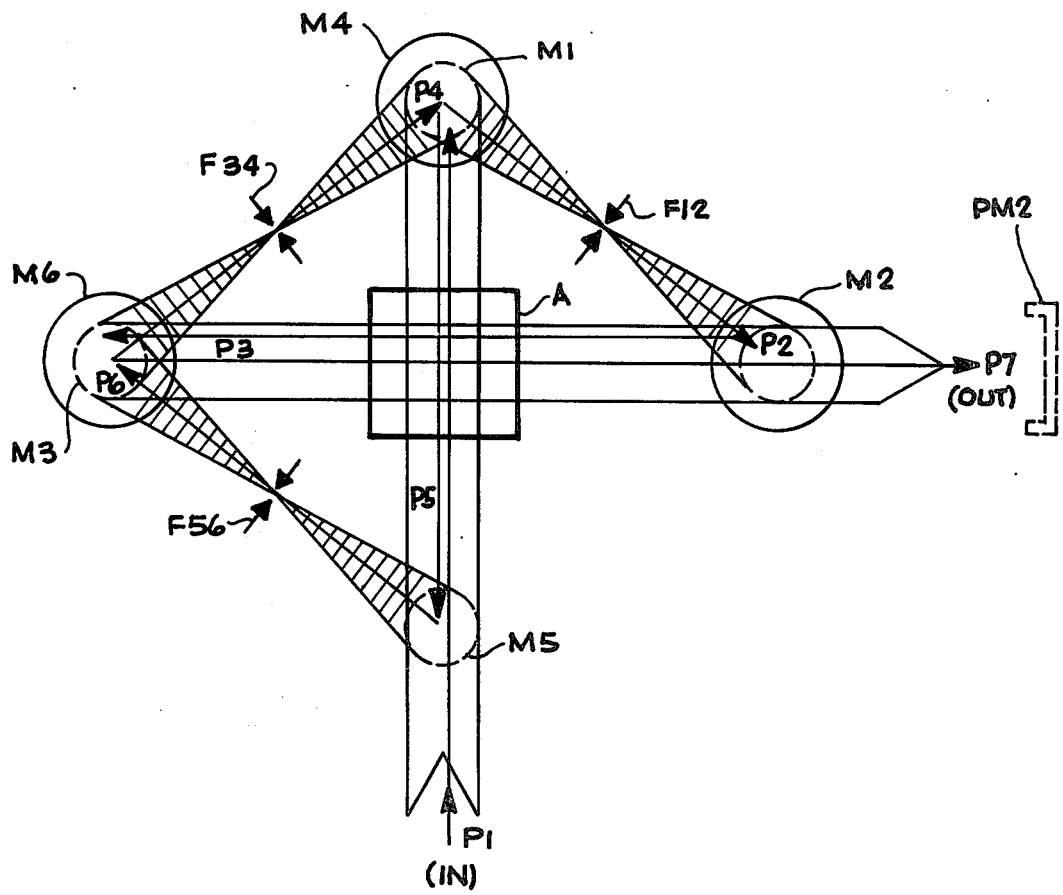
FIG. 2, is a schematic view of a four-pass embodiment with near-field separation of the laser beam paths, indicating a substantially symmetric arrangement using six focusing mirrors.

Clearly, adding additional concave mirrors to the configuration in FIG. 1 increases the number of passages of a reflected light beam through the amplifier A in one or two round trips of the beam within the optical cavity thus defined. A four-pass option, using six concave mirrors, is shown in FIG. 2. Six concave mirrors M1-M6 are spaced apart and generally face a centrally located amplifier A as shown. In the schematic top view of FIG. 2, mirror M1 (dotted lines) lies behind and is spaced apart from mirror M4, and mirror M3 (dotted lines) lies behind and is spaced apart from mirror M6; finally, mirror M5 lies behind the plane generally defined by the mirrors M2, M4, and and M6. A collimated light beam enters the optical cavity along path P1, passes through amplifier A and is reflected at mirror M1. The reflected light is focused by the action of the concave mirror M1 and passes along path P2 through the aperture of spatial filter F12 (optional) to concave mirror M2, which reflects and recollimates the light beam so that the beam passes along path P3 through amplifier A to concave mirror M3. This process is repeated at M3: the reflected light proceeds along path P4 and is focused through the aperture of spatial filter F34 (optional) so that it arrives at concave mirror M4 which recollimates the light and reflects it along path P5 through amplifier A to concave mirror M5. The process is repeated a third time: the light reflected at M5 is refocused and proceeds along path P6, passing through the aperture of spatial filter F56 (optional) to concave mirror M6 which recollimates and reflects the light beam along path P7 through amplifier A and out of the optical cavity. Again, one may alternatively position a plane mirror PM2 (optional) in the path P7 of the exiting beam so as to reflect the beam and cause it to retrace its original path in the opposite direction; the beam will then exit from the system along path P1, but oppositely directed, having passed through the amplifier A eight times.

Figure 3:
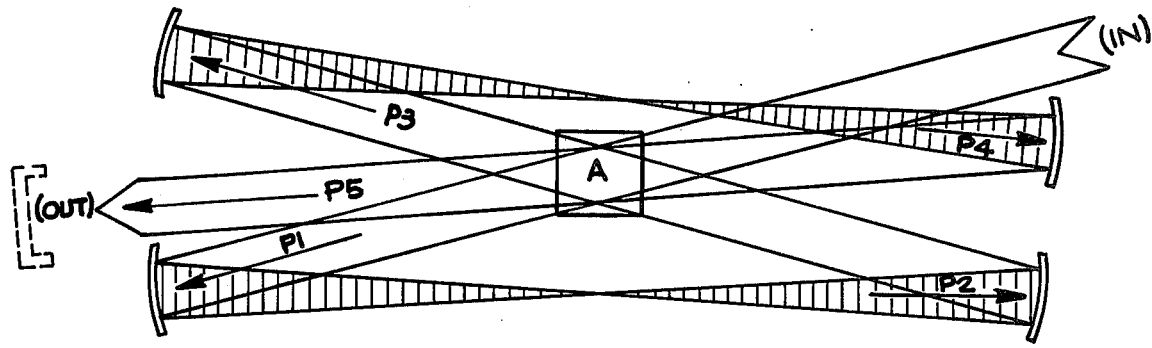
FIG. 3, is a schematic view of a three-pass embodiment with near-field laser beam path separation, using four focusing mirrors.

More generally, a system having a central amplifier and 2N appropriately placed, concave mirrors will cause an incident light beam to pass through the amplifier N+1 times before the beam exits from the system. The mirrors $2K-1$ and $2K$ ($K=1,2,\ldots,N$) are spaced apart by the sum of their focal lengths, and one may optionally include a spatial filter at the beam waist between these two mirrors. FIG. 2 corresponds to N=3. FIG. 3 indicates a suitable configuration for N=2.

Another embodiment of the invention is where the mirrors 1 through 6, are concentrically arranged around the central axis of the light amplifier A. This embodiment has the advantage that identical concave mirrors are used so that the problem of maintenance of spare mirrors is reduced. It is clear that other considerations such as access to the amplifier might require different positions of the spatial filters and mirrors and thus require different associated focal lengths for the mirrors. For such a case the mirrors might be spherical, ellipsoidal or cylindrical. The spatial filters shown in FIG. 2 may, if desired, have differing aperture diameters and thus different associated cutoff frequencies.

The optical cavities of FIGS. 1 and 2 are adjusted to optically reimage the amplifier, or any other chosen component, on itself within the cavity so as to reduce the growth of transverse intensity ripples on the laser beam. The condition of optical relaying or optical reimaging is fulfilled by imposing the condition $$d_1(f_1/f_2)+d_2(f_2/f_1)=f_1+f_2$$

in FIG. 1, where $d_1$ and $d_2$ are the distances from the center of amplifier A to the mirrors M1 and M2, respectively, and $f_1$ and $f_2$ are the associated focal lengths of the two concave mirrors. Optical relaying is a technique that reimages each ray of a light beam at the same radial position, apart from a uniform magnification factor, at some downstream position so as to suppress the development of intensity variations across the light beam. This technique is discussed fully in the U.S. Patent application (Ser. No. 830,972) by John T. Hunt and Paul A. Renard for a Spatial Filter System As An Optical Relay Line, assigned to the same assignee and incorporated by reference herein.

Figure 4:
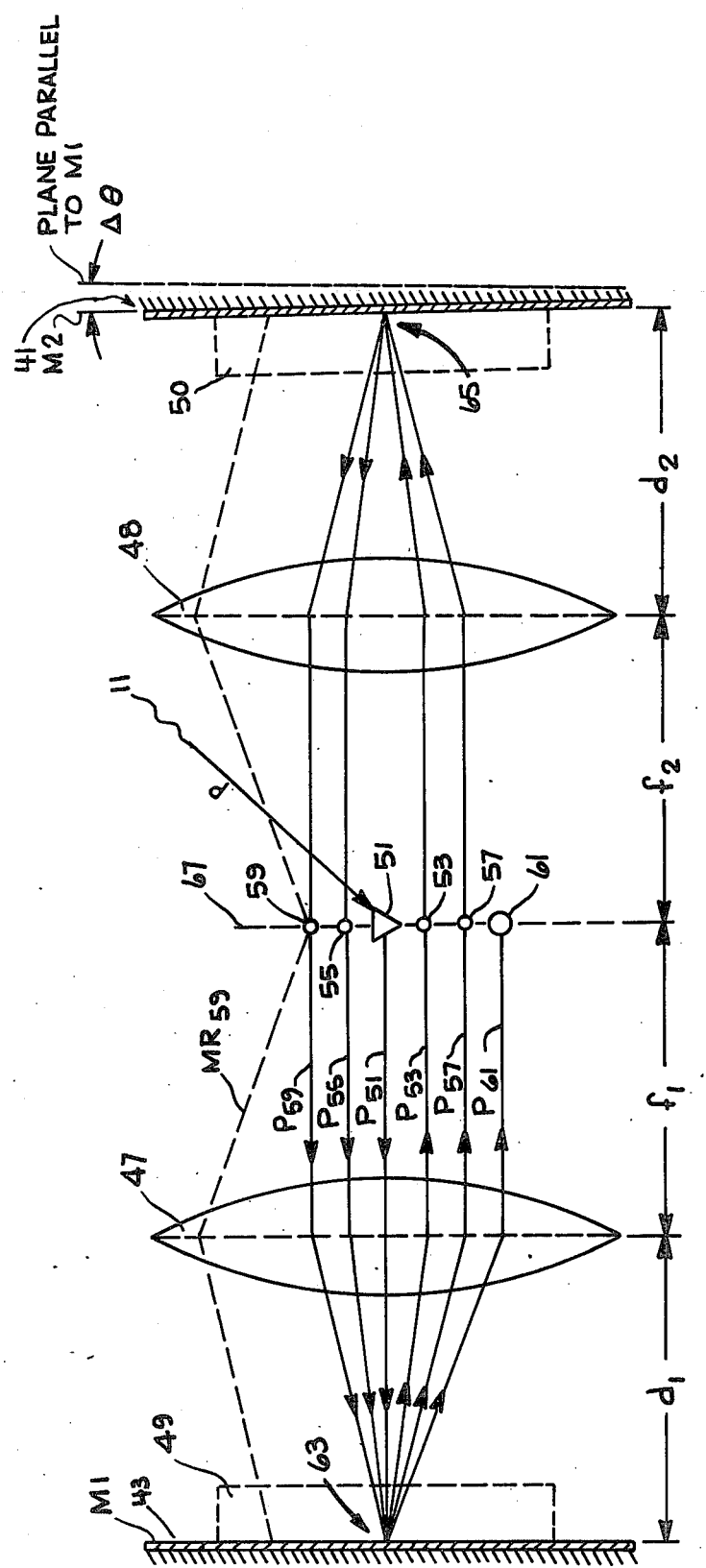
FIG. 4, is a schematic view of a multipass embodiment with far-field separation of the laser beam paths.

FIG. 4 shows yet another embodiment of the invention, a multipass configuration for far-field optical separation of a sequence of laser beam paths. Two plane mirrors 41 and 43 define the optical cavity, and one mirror is tilted by a small angle $\Delta\theta$ with respect to the other mirror, as shown. The initial beam is introduced into the cavity along the path P through a prism 51 or other optical component and successively traces out a path sequence $P_{51}$, $P_{53}$, $P_{55}$, $P_{57}$, $P_{59}$ and $P_{61}$, being reflected three times from mirror 41 and twice from mirror 43 in this example. The beam paths shown in FIG. 4 represent the central rays of the associated beams. For example, path $P_{59}$ has two marginal rays $MR_{59}$ as indicated. The number of beam paths in the sequence is, of course, optional in this embodiment. Due to the slight tilt of mirror 41 relative to mirror 43, the beam traces out a slightly different path each time it propagates from one mirror to the other, as suggested in FIG. 4. The cavity length is adjusted so that the centers of reflection of all of the laser beam paths coincide (at 63 and 65) on either one of the plane mirrors. In this arrangement, each of the mirrors or any other chosen part of the cavity is optically reimaged on itself.

The condition for optical relaying within the cavity of the embodiment shown in FIG. 4 (amplifier 49 to amplifier 50 or mirror 41 to mirror 43) is substantially fulfilled when the condition $$d_1(f_1/f_2)+d_2(f_2/f_1)=f_1+f_2$$

is satisfied, where $d_1$ and $d_2$ are the distances from the mirrors 41 and 43 to the respective focusing means 47 and 48. Each of these beams also has a beam waist at the common focal plane 67 located between the focusing means 47 and 48. The initial prism 51 is located near the focal plane 67, as are a sequence of spatial filter apertures 53, 55, 57, 59, used for beam "clean-up" after the beam makes successive passes through the amplifiers 49 and 50 positioned adjacent to the mirrors 41 and 43 as shown. The amplifier or amplifiers 49 and 50 may be repetitively pulsed prior to each traversal therethrough along the paths $P_{51}$–$P_{61}$; or the amplifier(s) material might have a sufficiently extended lifetime that one excitation of the amplifier media would suffice for the entire sequence of beam traversals. Initial prism 51 operates as a switch in this embodiment but other known switches are also considered equally useful.

The focusing means 47 and 48 act to focus each path of the beam at the corresponding spatial filter 53, 55, 57 and/or 59 so that the beam develops a waist at each of these spatial filter positions. However, if the beams were also focused to a point, say 63, on the mirror 41 (or 43) the damage threshold for the mirror and/or the adjacent amplifier could easily be exceeded, resulting in disabling optical damage of one or another of the components. For this reason, each of the beams propagating along the paths $P_{51}$–$P_{59}$ is not focused upon either of the mirrors 41 and 43. The beam which follows path $P_{59}$ has a wide beam front as it contacts and is reflected by the mirror 41.

After the peregrinating laser pulse has passed through the amplifier or amplifiers 49 and 50 a sufficient and desired number of times, the beam is passed to a target at 61 (replacing one of the spatial filters). In FIG. 3 one notes that, with the exception of the beam propagation path $P_{57}$, none of the other beam paths passes close to the target shown there. This protects the target from undesirable prior illumination until the main amplified pulse is directed to the target.

The use of each spatial filter only once by any beam passing through the system allows the use of different aperture diameters and associated filter cutoff frequencies. In such a case the total time for traversal of a laser pulse through the system will be made quite short, as low as 10 nsec. This will allow the use of some moderately long lived gaseous amplifier media such as those discussed in the accompanying U.S. Patent application Ser. No. 868,639, entitled Multiple Excitation Regenerative Amplifier Inertial Confinement System by E. Victor George et al, assigned to the same assignee and incorporated by reference herein.

Figure 5:
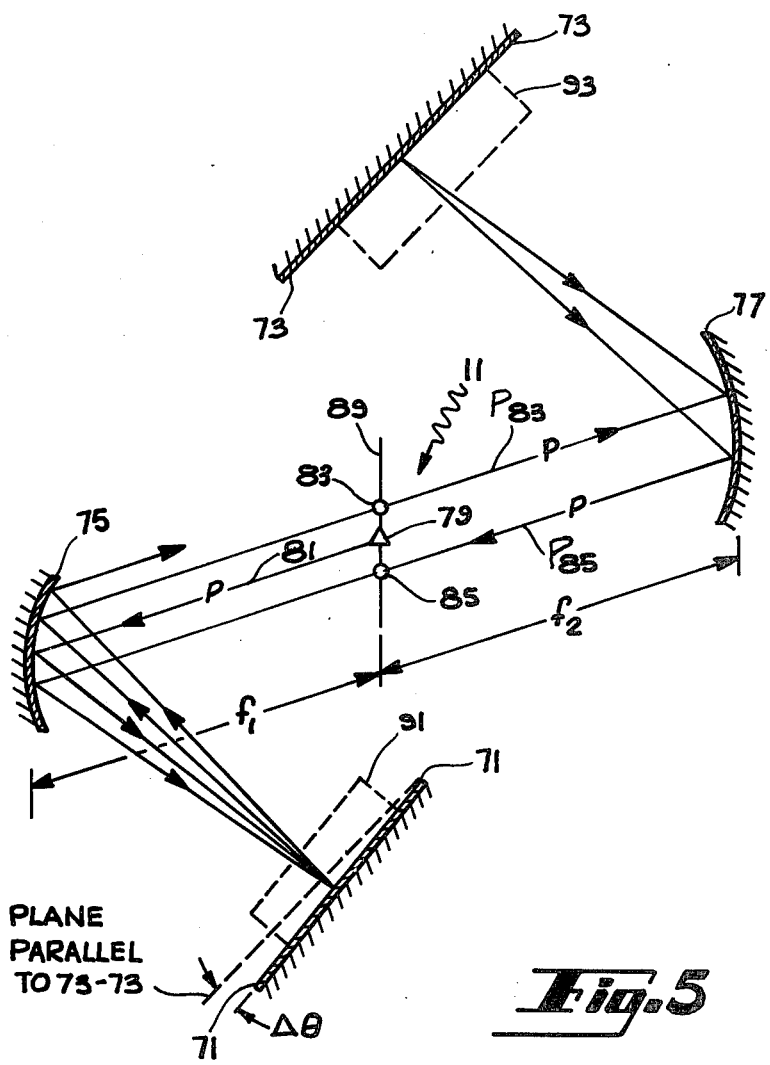
FIG. 5, is a schematic view of an alternative arrangement of FIG. 4, wherein one or more of the focusing lenses is replaced by a focusing mirror.

FIG. 5 illustrates yet another alternate embodiment of the far-field optical separation approach of FIG. 4, using two plane mirrors 71 and 73, tilted at a suitable angle relative to one another, defining the optical cavity. Concave mirrors or other suitable reflecting and focusing means 75 and 77 are placed as shown to reflect and focus the collimated light beam arriving from the associated mirror; or, alternatively, reflect and defocus (recollimate) the light beam arriving from the other focusing means 75 and 77. Again, the plane mirrors 71 and 73 are oriented so that the light beam, introduced into the cavity through a prism or other device 79, successively traces out a sequence of paths $P_{81}$, $P_{83}$ and $P_{85}$, being reflected two times from plane mirror 71 and once from mirror 73 in this example.

For the embodiment of FIG. 5 each of the sequence of beam paths has a beam waist at the common focal plane 89, and a sequence of spatial filter apertures 83 and 85 (optional) may be placed at these beam waist positions for beam cleanup as before. Either one amplifier 91 or two amplifiers 91 and 93 are placed adjacent to the plane mirrors 71 and 73 as shown for beam amplification on each beam pass. In this embodiment a target can be located on the path $P_{85}$ at 85 for irradiation by the amplified beam. Optical relaying is also practical in this embodiment.

The subject invention includes a species of the large aperture regenerative amplifier concept disclosed in U.S. Patent Application Ser. No. 868,644 by John L. Emmett for a Laser System Using Regenerative Amplifier, filed on the same day as this application, assigned to the same assignee and incorporated by reference herein.

Although any of the foregoing embodiments of the subject invention may be practiced in the normal atmosphere, the optical cavities are best maintained in a vacuum housing (not shown) or at low air pressures in order to avoid dielectric breakdown or other deleterious effects associated with concentration or propagation of high intensity light in the atmosphere. Also as is well known in the art focusing elements may be concave mirrors or lens with equivalent designs using each.

The claimed invention may be used to amplify a laser beam for finding ranges, joining materials, generating plasmas, producing neutrons, producing x-rays, and any other method for which lasers are known to be used.

Although the preferred embodiments of the subject invention have been shown and described herein, it will be apparent that modification and variation may be made without departing from what is regarded as the subject matter of the invention.

What I claim is:

1. Apparatus for multiple pass amplification of a light beam by an amplifier, the apparatus comprising:
    at least one light beam amplifier;
    at least two concave mirrors, each mirror having a focal length, and any two mirrors being spaced apart by an optical path whose path length is substantially the sum of their focal lengths;
    the at least two concave mirrors being positioned about a light beam amplifier so that light passing through the amplifier is reflected and focused by a first concave mirror, passes to a second concave mirror without first passing through the amplifier, is reflected and substantially recollimated by the second concave mirror, and passes again through the amplifier.

2. Apparatus according to claim 1, further including a plane mirror, positioned in the path of the light beam after the beam has passed through said amplifier a second time so as to reflect the light beam substantially back in the direction from whence the beam arrives at the plane mirror.

3. Apparatus according to claim 1, further including a spatial filter, positioned substantially at the waist of the focused beam that bypasses the amplifier in moving from said first concave mirror to said second concave mirror.

4. Apparatus according to claim 1, wherein at least one of said concave mirrors is a substantially spherical mirror.

5. Apparatus according to claim 1, wherein the light beam fills the clear aperture of the amplifier on its final pass.

6. Apparatus according to claim 1, wherein there is a single amplifier.

7. Apparatus according to claim 1, wherein there is more than one amplifier in the light beam.

8. Apparatus for multiple pass amplification of a light beam by an amplifier, the apparatus comprising:
    at least one beam amplifier;

a sequence of 2N concave mirrors, where N is some positive integer, each mirror has a focal length, and for all sequential pairs (K, K+1) mirrors K and K+1 (K=1,2, ... 2N−1) are spaced apart by an optical path length that is substantially the sum of the focal lengths of these two mirrors for all sequential pairs of mirrors (K, K+1);

at least one of said pairs of the mirrors being positioned adjacent to one of the amplifiers so that a substantially collimated light beam passes through this amplifier, is reflected and focused by mirror K, passes to mirror K+1 without first passing through the amplifier, is reflected and substantially recollimated by mirror K+1, and again passes through one of the amplifiers.

9. Apparatus according to claim 8, further including spatial filter positioned substantially at the beam waist developed between at least one of said mirror pairs K and K+1 (K=1,2, ... , 2N−1).

10. Apparatus according to claim 8, further including a third, a fourth, a fifth and a sixth concave mirror, all having focal lengths;
with the third and fourth mirrors being spaced apart by an optical path whose length is substantially the sum of their focal lengths;
with the fifth and sixth mirrors being spaced apart by an optical path whose length is substantially the sum of their focal lengths;
with the third, fourth, fifth and sixth mirrors positioned about said amplifier so that the light beam is reflected and focused by said first mirror, is reflected and substantially recollimated by said second mirror, passes through said amplifier, is reflected and focused by the third mirror, is reflected and substantially recollimated by the fourth mirror, passes through said amplifier, is reflected and focused by the fifth mirror, and is reflected and substantially recollimated by the sixth mirror.

11. Apparatus according to claim 8, further including an optical relay for at least one of the sequential pairs of mirrors (K, K+1).

12. Apparatus according to claim 8, wherein at least one of said concave mirrors is a spherical mirror.

13. Apparatus according to claim 8, wherein for some choice of the positive integer K(K=1,2, ... , 2N−1) the spacing between said mirrors K and K+1 is slightly less than the sum of the focal lengths of said mirrors K and K+1 so that for a collimated light beam that approaches said mirror K and is reflected toward said mirror K+1, the beam is slightly divergent after reflection from said mirror K+1.

14. Apparatus according to claim 8, further including a plane mirror, positioned in the path of the light beam after the last passage of the beam through said amplifier so as to reflect the light beam substantially back in the direction from whence the beam arrives at the plane mirror.

15. Apparatus according to claim 8, wherein there is one beam amplifier.

16. Apparatus according to claim 8, wherein there is more than one beam amplifier.

17. Apparatus for multiple pass amplification of a light beam by an amplifier, the apparatus comprising:
at least two plane, highly reflective mirrors, spaced apart an optical path length and defining an optical cavity therebetween, the planes of the two mirrors not being parallel but being oriented at a small angle $\Delta\theta$ with respect to one another;

first focusing means, having a first focal length, for focusing a collimated light beam;
the first focusing means being spaced apart from a first plane mirror by an optical path length greater than zero and being positioned between the first plane mirror and a second plane mirror;
the first focusing means being operative to focus a collimated light beam travelling from the first plane mirror to the first focusing means, at a point an optical path distance equal to the first focal length beyond the first focusing means;
second focusing means, having a second focal length, for focusing a collimated light beam;
the second focusing means being spaced apart from a second plane mirror by an optical path length greater than zero and being positioned between the first focusing means and the second plane mirror and lying at an optical path length substantially the sum of the first and second focal lengths from the first focusing means;
the second focusing means being operative to focus a collimated light beam travelling from the second plane mirror to the second focusing means at a point an optical path distance equal to the second focal length beyond the second focusing means;
optical switch means, positioned between the two plane mirrors, for introducing a light beam incident upon the optical switch means into the optical cavity so that the light beam travels toward one of the two plane mirrors; and
at least one light beam amplifier, positioned adjacent to one of said plane mirrors within said optical cavity.

18. Apparatus according to claim 17, further including at least one spatial filter, positioned at a common focus point between said two focusing means, so that light reflected from one of said two plane mirrors that is passed through said adjacent focusing means, is focused on the aperture of the spatial filter and passes through to said other focusing means.

19. Apparatus according to claim 17, wherein a light beam amplifier is positioned adjacent to each of said two plane mirrors within the optical cavity.

20. Apparatus according to claim 17, wherein a target is positioned at a common focus point of said two focusing means between said two focusing means.

21. Apparatus according to claim 17, wherein at least one of said first and said second focusing means is a lens.

22. Apparatus according to claim 17, wherein at least one of said first and said second focusing means is a concave mirror.

23. Apparatus according to claim 17, wherein said two focusing means and one of said light beam paths between said two plane mirrors form substantially an optical relay.

24. A method for amplification of a substantially collimated laser light beam, the method comprising the steps of:
passing the beam through an excited light beam amplifier;
reflecting and focusing the beam by a concave mirror having a focal length;
reflecting and substantially recollimating the beam by a second concave mirror having a focal length without first passing the beam through an amplifier, with the two concave mirrors being spaced apart by an optical path length that is substantially the sum of their focal lengths; and again passing the beam through an excited amplifier.

25. A method according to claim 24, further including the step of passing the light beam through a spatial filter aperture, positioned at the light beam waist between said two concave mirrors.

26. A method according to claim 24, further including the step of arranging said amplifier and said two concave mirrors so that they form an optical relay.

27. A method according to claim 24, further including the steps of:
  reflecting and focusing the beam that has twice passed through an excited amplifier, by a third concave mirror having a focal length;
  reflecting and substantially recollimating the beam by a fourth concave mirror having a focal length without first passing the beam through an amplifier, the fourth concave mirror and the third concave mirror being spaced apart by an optical path length that is substantially the sum of these focal lengths;
  again passing the beam through an excited amplifier; and
  performing each of the above three steps at least once.

28. A method for amplification of a laser light beam, the method comprising the steps of:
  positioning two light beam focusing means, each having a focal length, so that the focusing means substantially face one another and are spaced apart by substantially the sum of their focal lengths;
  positioning a first plane mirror to receive, reflect and return a light beam arriving thereat from the first focusing means;
  positioning a second plane mirror to receive, reflect and return a light beam arriving thereat from the second focusing means;
  positioning said two plane mirrors so as not to be located between the two focusing means, and tilting the plane of the first plane mirror at a small angle relative to the plane of the second plane mirror, and arranging the plane of each mirror so that a light beam arriving from the corresponding focusing means is reflected non-perpendicularly thereat;
  positioning a light beam amplifier between at least one plane mirror and the corresponding focusing means, adjacent to the plane mirror;
  exciting the beam amplifier; and
  introducing the laser light beam into the optical cavity defined by the two plane mirrors so that the beam proceeds toward one of the focusing means.

29. A method according to claim 28, further including the step of positioning at least one spatial filter aperture between said two focusing means, spaced a distance from each focusing means that is the focal length of said focusing means.

30. A method according to claim 28, further including the step of positioning said two focusing means and said two plane mirrors so that the combination forms an optical relay.

31. A method according to claim 28, wherein the step of exciting said beam amplifier occurs before each passage of the light beam through the amplifier.

32. A method according to claim 28, wherein the step of exciting the at least one beam amplifier occurs once for a given laser light beam introduced into the optical cavity.

33. A method according to claim 24, further including the step of exciting said light beam amplifier before each passage of the beam through said amplifier.

34. A method according to claim 24, wherein the step of excitation of said light beam amplifier occurs only before the initial passage of the beam through said amplifier.

35. Apparatus according to claim 12, wherein the concave mirrors are identical spherical mirrors.

36. Method for multiple pass amplification of a light beam, comprising the steps of:
  passing the beam through at least one excited light beam amplifier;
  focusing the beam by a first focusing element having a first focal length;
  reflecting the beam by a first mirror;
  recollimating the beam by a second focusing element having a second focal length without first passing the beam through one of the said at least one amplifier;
  spacing the first and second focusing elements apart by an optical path length that is substantially the sum of the first and second focal lengths;
  reflecting the beam by a second mirror; and
  again passing the beam through said at least one amplifier.

* * * * *